United States Patent [19]
Leidy et al.

[11] 3,870,253
[45] Mar. 11, 1975

[54] AIRCRAFT VECTORED FLIGHT CONTROL MEANS

[75] Inventors: William S. Leidy, O'Fallon; Donald M. Scheller, Ballwin, both of Mo.

[73] Assignee: McDonnell Douglas Corporation, St. Louis, Mo.

[22] Filed: July 2, 1973

[21] Appl. No.: 375,633

Related U.S. Application Data

[63] Continuation-in-part of Ser. No. 164,621, July 21, 1971, abandoned.

[52] U.S. Cl. ................................. 244/46, 244/48
[51] Int. Cl. ............................................ B64c 3/38
[58] Field of Search ..... 244/43, 46, 48, 83 R, 83 A, 244/83 B, 83 C, 84, 86–91, 42 CC, 36

[56] References Cited
UNITED STATES PATENTS

| | | | |
|---|---|---|---|
| 1,856,093 | 5/1932 | Ford et al. | 244/48 |
| 2,108,093 | 2/1938 | Zimmerman | 244/36 |
| 2,260,952 | 10/1941 | Novack | 244/91 |
| 2,308,796 | 1/9143 | Dornier | 244/48 |
| 2,313,800 | 3/1943 | Burroughs | 244/82 |
| 2,369,832 | 2/1945 | Klose | 244/90 R |
| 2,734,701 | 2/1956 | Horton | 244/48 |
| 2,859,003 | 11/1958 | Servanty | 244/48 |
| 2,912,191 | 11/1959 | Millam | 244/48 |
| 3,260,481 | 7/1966 | Winborn | 244/43 |
| 3,653,611 | 4/1972 | Trupp et al. | 244/48 |

FOREIGN PATENTS OR APPLICATIONS

| | | | |
|---|---|---|---|
| 1,168,084 | 12/1956 | France | 244/42 CC |

*Primary Examiner*—Trygve M. Blix
*Assistant Examiner*—Jesus D. Sotelo
*Attorney, Agent, or Firm*—Gravely, Lieder & Woodruff

[57] ABSTRACT

An aircraft of either stable or unstable configuration having all movable wing tip surfaces for rapid increases in lift and subsequent aircraft longitudinal pitch control results from positioning of the wing tip surfaces for positive pitching moments which are then trimmed by trailing edge elevators to produce beneficial positive trim lift forces and having vertical control surfaces to obtain direct side forces for superior control of the aircraft. The aircraft herein has the unique capability of fuselage pointing in the horizontal and vertical axes without change in the flight path as would be the case with conventional aircraft.

5 Claims, 9 Drawing Figures

3,870,253

AIRCRAFT VECTORED FLIGHT CONTROL MEANS

This is a continuation-in-part of application Ser. No. 164,621 filed July 21, 1971 now abandoned and entitled CONTROLLABLE WING TIP AIRCRAFT and assigned to the same assignee.

BRIEF DESCRIPTION OF THE AIRCRAFT

The application of controllable wing tip surfaces is an advanced technology approach to improved aircraft maneuverability. The character of aircraft configuration to be described may possess longitudinal stability or instability, depending on the relationship of the lifting and control surfaces to the center of gravity. The aircraft is provided with control surfaces that include movable outer wings, a trimming elevator, one or more all movable vertical fins and it may also include a ventral canard surface. The advantage of a configuration of this character is that the aircraft has normal rotational control in pitch, bank and roll, and high levels of direct lift and direct side force, without angle of attack or bank. At high angle of attack and incidence, during subsonic maneuvers, wing leading edge slats are used to prevent flow separation. Also, high roll rates are attained through differential deflection of the all movable wing tips.

An aircraft of the foregoing configuration incorporates unique technologies which will provide significant advances in total flight capabilities at subsonic and supersonic velocities. The unique technology is based upon vectored flight controls which incorporate movable outer wings and elevator controllably operated to obtain fuselage angle-of-attack attitudes, as well as change of altitude of the aircraft without change of the flight path direction. The aircraft may also incorporate a vertical canard and all movable vertical tail surface for cooperation to effect lateral fuselage pointing as well as displacement of the fuselage without change of the flight path direction.

The aircraft combines primary flight control surfaces, such as movable outer wings and a trimming elevator, with all movable vertical surfaces to provide normal rotational control and high levels of direct lift and direct side force, without angle of attack or bank changes. The fuselage angle may be controlled independent of flight path or load factor, that is while holding a constant load factor of 8G, the fuselage angle of attack can be varied from below −4° to above 12°.

A multi-mode flight control system provides the pilot a means to take full advantage of the unique direct lift capabilities, plus the direct side force control for superior combat maneuverability. The vectored lift aircraft of this invention provides low cost and significant improvement in maneuverability due to high thrust-to-weight ratio. The most significant feature of the present aircraft is the independent fuselage aiming concept resulting from the use of direct lift and direct side force surfaces which can be coupled into a flight control system to give a pilot maneuverability advantages surperior to conventional aircraft.

The controllable all movable wing tip configuration also improves certain modes of aircraft operation. For instance, this configuration alleviates reactions to gusts which may occur during high speed, low altitude penetration. These gust loads may be offset by rapid deflection of the all movable wing tips.

In the conventional aircraft, having fixed wings and tail controls surfaces, the center of pressure of the wings is located behind the aircraft center of gravity. This configuration calls for a negative lift force from the tail surfaces for longitudinal control. Thus, in order to produce a positive maneuvering force the conventional aircraft must produce a negative force on the tail.

The objects of the present aircraft configuration are to produce positive trim lift forces, direct lift control, and reduced aircraft response time resulting in an improved maneuvering aircraft. Two pitching moment generators, the movable wing tip and the trailing edge elevator, produce the unque capability of a variable fuselage trim angle of attack at a constant maneuvering load factor. This capability will enhance the aircraft tracking capability for gunnery or bombing. The controllable wing tip aircraft also provides an excellent configuration for a control configured vehicle. This vehicle can also have a configuration which allows it to be flown as an unstable aircraft utilizing control forces for stability augmentation in pitch, yaw, and roll.

DESCRIPTION OF THE DRAWINGS

The present improvements in aircraft configuration are embodied in a preferred arrangement shown in the accompanying drawings, wherein.

DESCRIPTION OF THE PREFERRED AIRCRAFT EMBODIMENT

Figure 3:
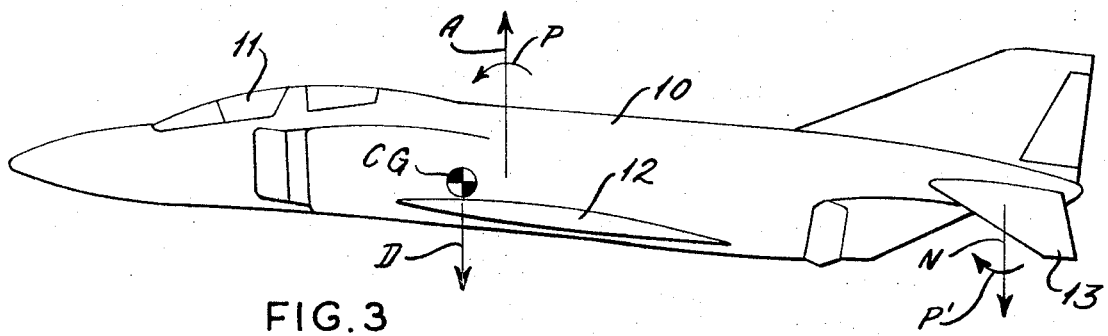
FIG. 3 is a side elevational view of a conventional aircraft configuration representative of the prior art.

First referring to the prior art aircraft configuration seen in FIG. 3, the fuselage 10 with the pilots cockpit indicated by the canopy 11 is provided with a fixed wing 12 having its positive lift force or center of pressure indicated by the arrow A and the resulting pitching moment indicated by the curved arrow P. The center of gravity is indicated at CG with its force depicted by the arrow D. In such an aircraft configuration the horizontal tail surfaces 13 must produce a negative (down) load on the aircraft indicated by the arrow N which produces a pitching moment indicated by the curved arrow P′. In this configuration the aircraft is penalized in its total lift forces by the negative lift at the tail surfaces 13 in order to maintain longitudinal control. When performing a maneuver such as increasing the angle of attack, the tail surfaces 13 must increase the negative lift forces and this causes the aircraft to rotate about its center of gravity with a resultant change in the longitudinal flight path.

Figure 1:
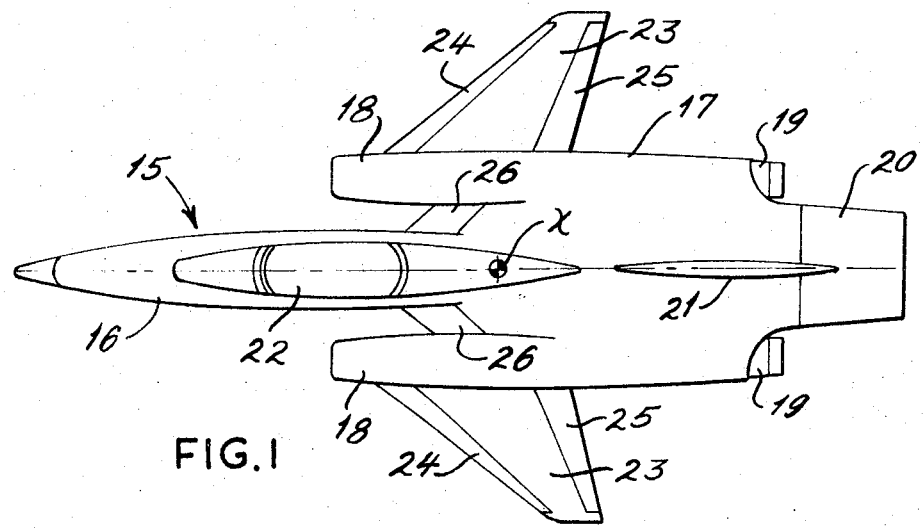
FIG. 1 is a plan view of the aircraft embodying all movable wing tips and an all movable vertical tail surface.
Figure 2:
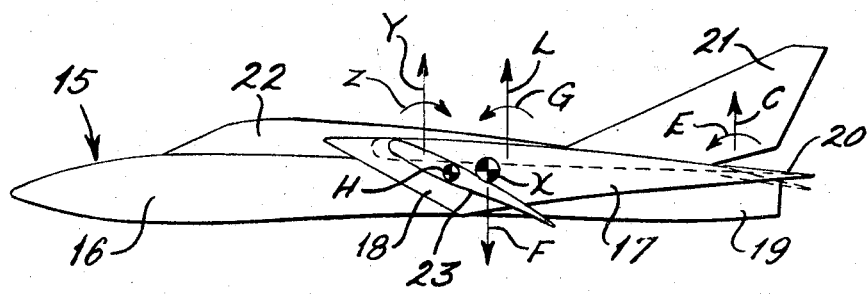
FIG. 2 is a side elevation of the improved aircraft showing the flight forces in relation to the center of gravity for positive total lift.

In FIGS. 1 and 2 one embodiment of the improved aircraft, as seen at 15, has a fuselage 16 provided with a lifting surface 17 and submerged jet engine pods 18 with the exhaust nozzles 19 adjacent the horizontal elevator surface 20. The all movable vertical tail surface 21 is mounted on the trailing portion of the flight surface 17 behind the cockpit canopy structure 22. Outboard of each engine pod 18 are the all movable wing tip surfaces 23, each having slats 24 and flaps 25, while the leading edges of the surface 17 inboard of the engine pods 18 are provided with slats 26.

This aircraft configuration (FIG. 2) has its center of gravity indicated at the point X producing a down force indicated by arrow F. The untrimmed lift of the aircraft is indicated (FIG. 2) by the arrow L which is behind the center of gravity thus producing a nose down pitching moment indicated by the curved arrow G. Longitudinal maneuvering of the aircraft 15 is achieved by rotating the wing tips 23 about the hinge axis H into a positive angle of incidence thereby producing a positive lift force indicated by arrow Y and a positive pitching moment indicated by arrow Z. Control of the longitudinal attitude is obtained by moving the tail surface 20 down to produce a positive lift indicated by arrow C and a negative pitching moment indicated by the arrow E. Thus, all of the surfaces 17, 20 and 23 produce positive lift forces to overcome the total aircraft weight (F).

Figure 4:
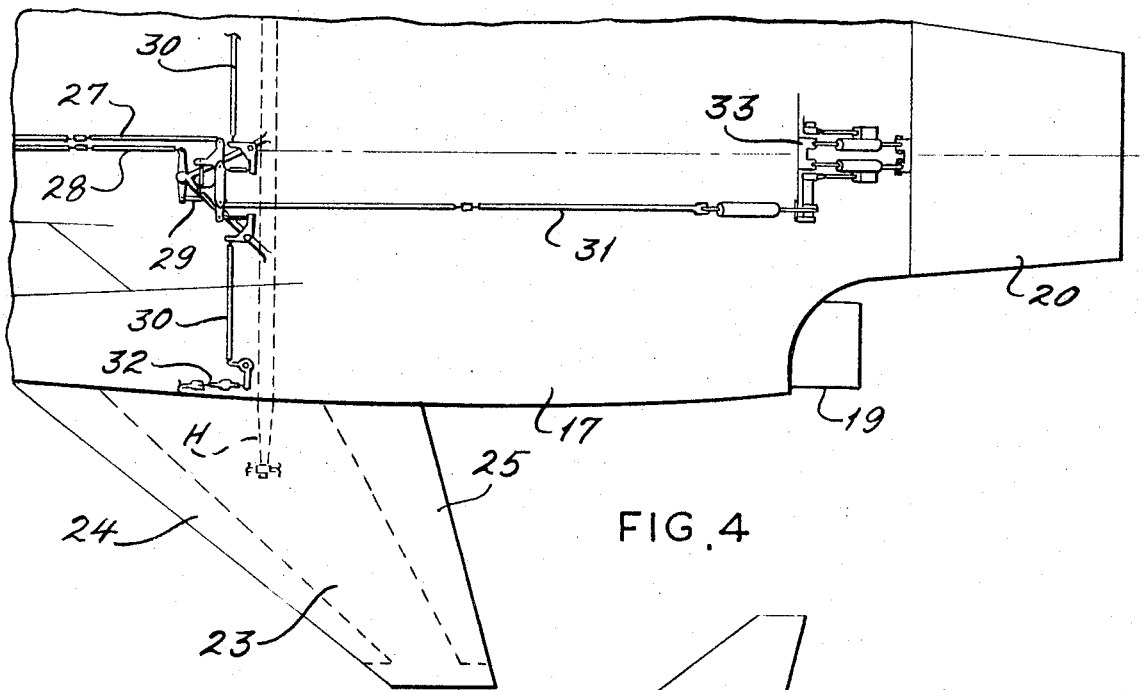
FIG. 4 is a greatly enlarged and fragmentary plan view of the aircraft of FIG. 1 showing one embodiment of controls therefor.
Figure 5:
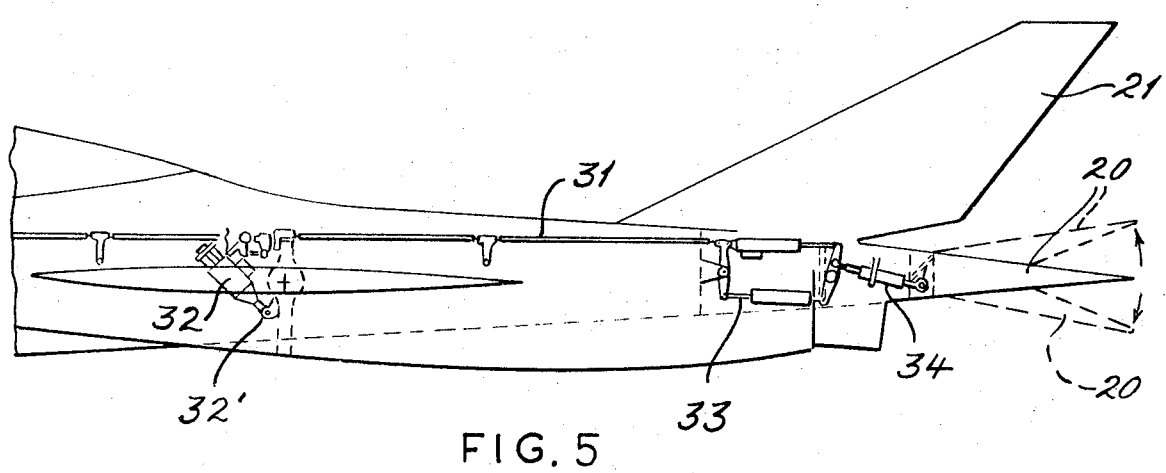
FIG. 5 is a greatly enlarged and fragmentary side view of the aircraft of FIG. 2 showing the same control embodiments.

Turning now to FIGS. 4 and 5, it can be seen that the pilot's controls (not shown) are operative through the links 27 and 28 and a suitable bell crank assembly 29 connected to the wing tip control links 30 and the elevator surface control link 31. Each link 30 controls a power actuator unit 32 connected by the crank 32' to the wing tip surface 23 (only one being shown) to rotate the surface 23 about the hinge H. In a similar manner link 31 is connected to a power actuator assembly 33 for moving the elevator surface 20 through a variable trim actuator 34.

Figure 6:
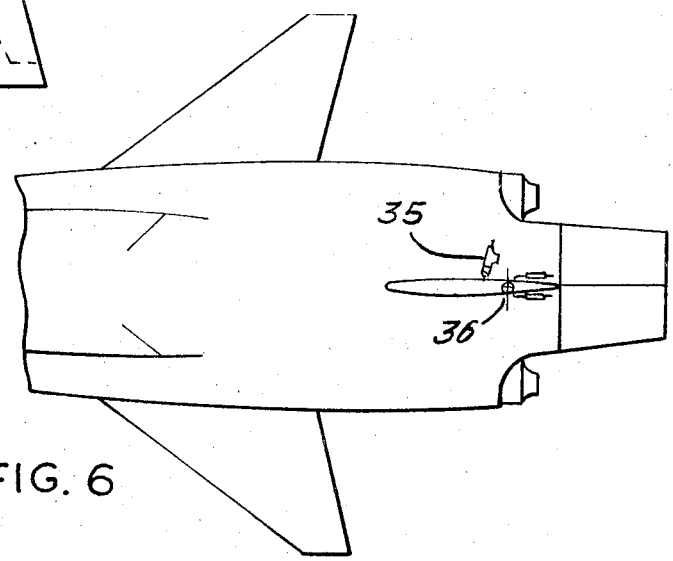
FIG. 6 is a fragmentary plan view of the tail surfaces for the aircraft embodiment seen in FIG. 1.

In FIG. 6 the all movable vertical tail surface 21 is moved about its hinge axis 36 by a suitable power actuator 35 under a pilot controlled link system which is not necessary to show.

The control system shown in schematic outline in the several views of the drawings is arranged to produce both simultaneous and differential movement of the all movable wing tip surfaces 23 for achieving a desired range of maneuverability, and this is, of course, combined with control over the tail surfaces 20 and 21.

With the foregoing description of the embodiment of aircraft flight control surfaces of FIGS. 1 and 2, it can be appreciated that positive lift forces are gained for achieving longitudinal control. Moreover, by providing all movable wing tip surfaces 23 substantially instantaneous positive nose up forces are produced. This control is followed by the pilot applying a tail down motion to maintain control which again produces a positive lift force. The advantage of this configuration is that the aircraft may be maneuvered into a higher or lower flight position without changing the flight direction. This is especially advantageous for combat maneuvering and gives the pilot the ability to change altitudes with the least delay and without having to follow a curving flight path which induces high G forces due to rotational accelerations. In addition, the aircraft may be pitched about its center of gravity up or down without changing the flight path thereby increasing the angle of effectiveness of offensive armaments when on the attack.

Figure 7:
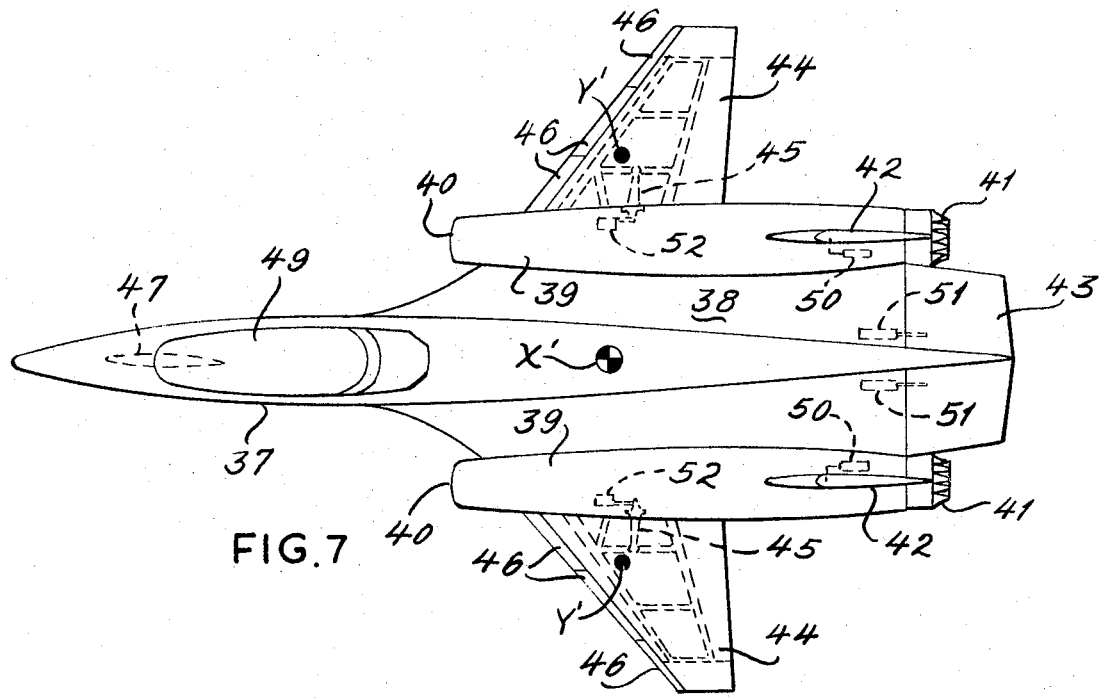
FIG. 7 is a plan view of the aircraft embodying modifications coming within the scope of this disclosure.
Figure 8:
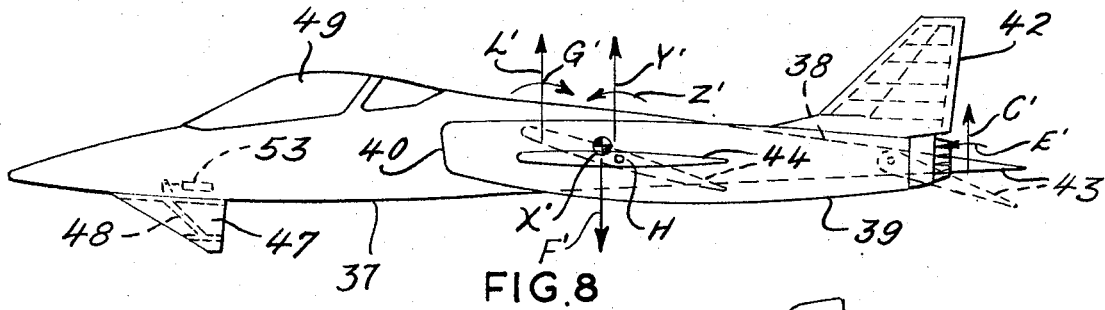
FIG. 8 is a side elevation of the aircraft seen in FIG. 7.
Figure 9:
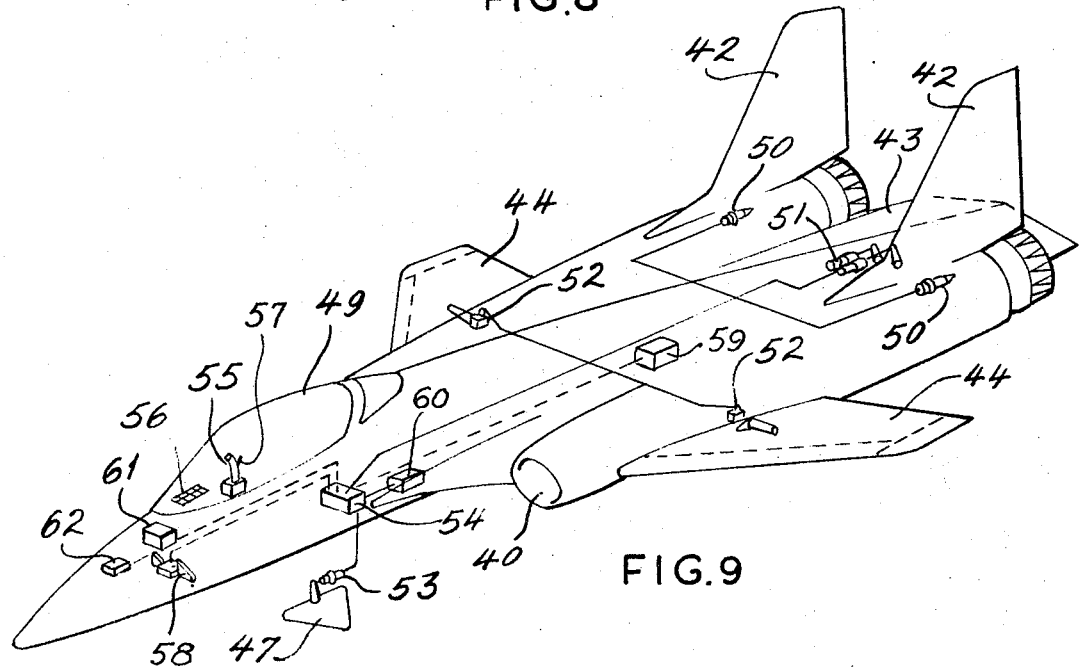
FIG. 9 is a schematic control system for the aircraft of FIGS. 7 and 8.

The aircraft embodiments of FIGS. 7, 8, and 9 comprises a fuselage 37 having a lifting surface 38 in which a pair of jet engine pods 39 are mounted with air inlets 40 and exhaust nozzles 41. Each pod 39 carries an all movable vertical surface 42, and the aft end of the lifting surface 38 carries a horizontal elevator (elevon) control surface 43. All movable wing tip surfaces 44 are carried outboard of the engine pods 39 to pivot about the hinge means 45, and the leading edge of each surface 44 is provided with decambering flaps 46 to reduce drag at transonic and supersonic velocities. In addition, the fuselage 37 is provided with a vertical ventral canard control surface 47 movable about a pivot 48 having its axis pitched so that the leading edge of the surface 47 will substantially hug the contour of the adjacent surface of the fuselage so as to maintain the effectiveness of this surface. The pilot is positioned under the canopy 49.

A fly-by-wire control system is seen in FIG. 9 for operating the movable surfaces 42, 43, 44 and 47. For example, each of the vertical surfaces 42 has an actuator 50, the elevator 43 has a pair of actuators 51, and each wing surface 44 is pivoted by an actuator 52. These actuators 50, 51 and 52 are electrically connected to flight control computer means 54 adjacent the pilot's cockpit. The canard surface 47 is pivoted by actuator 53 electrically connected to control means 54. The control means 54 is one component of a more complete control system which includes the pilot's stick 55 and other means to be described.

The control system of FIG. 9 for the aircraft of FIGS. 7 and 8 is a three-axis triply redundant hybrid analog/digital fly-by-wire flight control system with high reliability components. The elements and components of the flight control system include the hybrid analog/digital flight control computer 54 which accepts electrical signal inputs from the pilot's cockpit controller transducers, the airframe motion sensors, Air Data Computer (ADC), and actuator position sensors. The computer processes these signals according to the mode of operation selected by the pilot on the mode selection panel 56 and outputs the proper electrical signals to the hydraulic servo actuators 50, 51, 52 and 53 to deflect all the control surfaces in the proper blend to achieve the pilot-command aircraft motion. In addition to enabling the pilot to command aircraft motion rather than control surface position, the flight control system provides full time closed loop artificial static and dynamic stabilization through active feedback control. The pilot's cockpit controllers consist of the side stick controller 55 through which the pilot commands load factor and roll rate in a conventional manner, a translation mode controller 57 which is an isometric button located on the side stick 55 through which the pilot commands vertical and lateral translation motion of the aircraft, a set of conventional rudder pedals 58 for yaw rate control, and the mode select panel 56 on the forward cockpit panel and mode select buttons (not shown) on the side stick 55 for the selection of any of the unique features and modes of operation. The airframe motion sensors consist of rate gyros 59 to measure aircraft pitch, roll, and yaw rates and accelerometers 60 to measure normal and lateral accelerations. It is these sensed motions that are used as feedbacks through the flight control computer 54 to the control surfaces for stabilization of the unstable airframe. An air data computer 61 is provided to accept signals from the air data sensors collectively seen at 62, and to convert the sensed pressures and temperatures into electrical signals. These signals are processed to determine such parameters as dynamic pressure, air speed, Mach number, etc. These calculated parameters are then used as inputs to the flight control computer 54 and for instrumentation. The actuator position sensors are used to transmit control surface deflections to the flight control computer 54. The use of multiple aerodynamic control surfaces provides the means for partial or complete decoupling of all six degrees of rotational and translational motions of the aircraft and leads to a unique set of modes of operation.

Referring again to the aircraft embodiment of FIGS. 7 and 8, it has been noted that it is unstable, which is to say that the aerodynamic center of the fuselage 37 depicted by the arrow L' is ahead of the aircraft center of gravity X'. The effect of the center of gravity is to exert a down load represented by the arrow F', and the effect of the forward location of the aerodynamic center of the fuselage 37 is to impose a nose-up pitching moment, arrow G', on the aircraft. This nose-up pitching moment is reduced by pivoting the wing surfaces 44 which possess an aerodynamic center aft of the CG to impose an incremental nose-down pitching moment, arrow Z', on the aircraft as the aerodynamic center for the wing surfaces is represented by the arrow Y' aft of the center of gravity. The elevator surface 43 must be actuated to a trailing edge down position so its aerodynamic center, arrow C', will develop a tail up pitching moment, arrow E', on the aircraft about its center of gravity. It is now understood that the unstable aircraft embodiment of FIGS. 7 and 8 will produce positive trim forces from the elevator 43 to more than offset the nose-up pitching moment of the fuselage 37 and all movable wing surfaces 44.

The embodiments of FIGS. 1 and 2, and of FIGS. 7 and 8 have the unique control surface configuration of pivoted or all movable outer wings and a trimming elevator to provide normal rotational control and high level of direct positive or negative lift without change of angle of attack of the fuselage. In addition, the embodiment of FIGS. 7 and 8 possesses the unique feature of being able to shift the position of the total aircraft laterally by applying direct side forces without banking as in conventional flight maneuvering. In either embodiment there is provided a new degree of freedom in flight control by fuselage pointing or bodily shift vertically, with no substantial change of the flight path, and the embodiment of FIGS. 7 and 8 adds the unique freedom of flight control in azimuth by movement of the vertical surfaces 42 and the canard surface 47 to develop direct side forces.

The all movable wing tip configuration of either FIG. 1 or FIG. 7 has the distinct advantage that direct lift and trim lift forces are in the same direction during transonic normal load factor maneuvers, as compared with the prior art configuration which produces substantial loss in normal load factor capability due to large negative trim lift forces. Furthermore, the movable wing tips provide extremely rapid normal load factor build up due to high deflection rate of the tip surfaces, whereas the prior art configuration must wait to finite period of time while the whole aircraft rotates to build up the normal load factor. Rapid roll response is achieved by the wing tips, even at high angles of attack, due to increase effectiveness of these movable wing tips.

The aircraft configured as in FIGS. 1 and 2 has the total lift of the surfaces, at subsonic velocities, aft of the center of gravity. This gives the aircraft a stable condition. In this configuration the effective aerodynamic center of the wing tip surfaces 23 is ahead of the center of gravity, and when trimming the aircraft with the wing tip surfaces 23 deflected to a positive incidence setting, the elevator 20 deflects trailing edge down to a trim position and produces a positive lift. In other words, this configuration, while stable, develops positive lift from the wing tip surfaces 23 and the elevator surface 20 for trimmed flight.

The aircraft configuration of FIGS. 7 and 8 has the total lift of the surfaces, at subsonic velocities ahead of the center of gravity. This gives the aircraft an unstable condition. In this configuration the aerodynamic center of the wing tip surfaces 44 is slightly aft of the center of gravity. Now, this requires the elevator surface 43 to be moved to a trailing edge down position to trim the aircraft, and this develops positive lift.

The foregoing disclosure is directed to aircraft configured to combine, in a unique arrangement, an elongated fuselage formed to provide a primary lifting surface having its aerodynamic center and center of gravity on the longitudinal axis of the fuselage, all pivoted wing surfaces outboard of the primary lifting surface and having an effective aerodynamic center offset from the aerodynamic center of the primary surface and from the center of gravity in the direction of the longitudinal axis of the aircraft, and horizontal trim and directional control surface means operable on the fuselage aft of the center of gravity, the primary surface and pivoted wing surfaces having the aerodynamic centers thereof acting to impose pitching moments in opposition to each other about the center of gravity, and the horizontal control surface operating in horizontal flight of the aircraft to provide positive trim forces to offset any inequality of pitching moments imposed by the primary and wing surfaces.

The disclosure is directed also to an aircraft having the foregoing unique configuration of components wherein for a given flight path the fuselage may be pointed at some predetermined angle to the horizontal and vertical, or a combination of both horizontal and vertical angles. Furthermore, the aircraft when provided with the control surfaces above disclosed is maneuverable to change elevation or to move laterally, all with no significant change in the flight path heading.

What is claimed is:

1. In an aircraft, the combination of:
   1. an elongated fuselage providing a primary lifting surface having the aerodynamic center and center of gravity offset from each other on the longitudinal axis of the fuselage;
   2. all movable wing surfaces pivotally mounted on the outboard sides of said fuselage and having the aerodynamic center offset from said aerodynamic center and center of gravity in the direction of the longitudinal axis of the aircraft,
      a. said primary surface and wing surfaces having the respective aerodynamic centers thereof acting to impose pitching moments in opposition to each other about the center of gravity;

3. longitudinal elevator control surface means operable on said fuselage aft of the center of gravity,
   a. said elevator control surface means providing longitudinal flight control forces to trim and control pitching moments on the aircraft imposed by said primary surface and wing surfaces;

4. and control means connected to said wing surfaces and elevator control surface means for selective operation for
   a. controlling the pointing of the longitudinal axis of the aircraft about the center of gravity independently of a predetermined longitudinal flight path and load factor by deflection of said elevator control surface and counter deflection of said wing surfaces,
   b. and controlling a change in the altitude of the aircraft while flying a predetermined flight path by vertical translation of the aircraft to a different elevation generally parallel to said predetermined flight path by concurrent deflection of said wing and elevator surfaces to positive and negative angles of incidence in a selective mode.

2. The improvement in the aircraft of claim 1 wherein said fuselage center of gravity is forward of said aerodynamic center for said primary surface to render said aircraft essentially stable, and said aerodynamic center for said wing surfaces is forward of said fuselage center of gravity.

3. The improvement in the aircraft of claim 1 wherein said fuselage center of gravity is rearwardly of said aerodynamic center for said primary surface to render said aircraft essentially unstable, and said aerodynamic center for said wing surfaces is rearwardly of said fuselage center of gravity.

4. The aircraft of claim 1 wherein said pitching moments imposed by said primary and wing surfaces are unequal to impose a resultant nose-down pitching moment on the aircraft, and said longitudinal elevator control surface means and wing surfaces are operated by said control means to counteract said nose-down pitching moment.

5. The aircraft of claim 1 and including a vertical control surface aft of the fuselage center of gravity and a vertical control surface forward of the center of gravity, and said control means being operably connected to said aft and forward control surfaces to effect operation thereof for imposing side forces on the aircraft and consequent lateral displacement of the aircraft to a new flight path generally parallel to a given longitudinal flight path.

* * * * *